(12) United States Patent
Ettinger et al.

(10) Patent No.: US 7,271,346 B1
(45) Date of Patent: Sep. 18, 2007

(54) WINDOW SEAL WITH ELECTRICAL RACEWAY

(76) Inventors: Mark Ettinger, 1373 NW. Coconut Pt. La., Stuart, FL (US) 34994; Susan C. Burkhart, 1804 West Morrison Ave., Tampa, FL (US) 33606

( * ) Notice: Subject to any disclaimer, the term of this patent is extended or adjusted under 35 U.S.C. 154(b) by 0 days.

(21) Appl. No.: 11/539,400

(22) Filed: Oct. 6, 2006

(51) Int. Cl.
*H01B 7/00* (2006.01)

(52) U.S. Cl. ..................................... 174/135

(58) Field of Classification Search ............... 174/135, 174/136, 72 A; 248/56; 439/502
See application file for complete search history.

(56) References Cited

U.S. PATENT DOCUMENTS

| | | | |
|---|---|---|---|
| 1,125,015 A * | 1/1915 | Field | 454/214 |
| 5,135,413 A * | 8/1992 | Pannizzo | 439/577 |
| 5,803,764 A * | 9/1998 | Ness | 439/501 |
| 6,392,147 B1 * | 5/2002 | Hier et al. | 174/70 C |
| 6,497,502 B1 * | 12/2002 | Clift et al. | 362/392 |
| 6,564,512 B1 * | 5/2003 | Whittemore | 52/37 |

* cited by examiner

*Primary Examiner*—Neil Abrams
(74) *Attorney, Agent, or Firm*—McHale & Slavin, P.A.

(57) ABSTRACT

The present invention provides a device which permits the passage of an electrical cords or wires through an open window or door into a building while providing a weather proof seal for the opening and preventing the entry of carbon monoxide and other fumes into the building. The device also prevents the entry of insects and/or small animals into the building thereby preventing the introduction of diseases and other health issues. The device prevents damage to the electrical cords or wires by not permitting the window or door to close directly onto the cords. The device allows the electrical cord length to be adjusted. A provision is made in the device to allow the passage of the electrical cord therethrough while maintaining the integrity of the sealed opening. The device may be formed from a number of different materials, closed cell foam being a preferred material. The device is preferably an elongate member with a provision for electrical cords to pass transversely therethrough. The opening for the electrical cord can be adjusted to accommodate different size cords. The device can be manufactured in a standard size and cut to fit a specific opening in a window or door.

16 Claims, 6 Drawing Sheets

WINDOW SEAL WITH ELECTRICAL RACEWAY

FIELD OF THE INVENTION

The present invention relates to a sealing member for window and door openings in buildings, through which an electrical cord passes from a portable electrical generator located on the outside of the building, which provides weather proofing and prevents the entry of carbon monoxide into the building through the openings.

BACKGROUND OF THE INVENTION

There are large numbers of portable electric generators which are used by private individuals, home owners and businesses as temporary emergency sources of electrical power during electrical power outages in different geographical regions of the world. These power outages have many causes such as snow, hail and ice storms, tornadoes, sandstorms, tropical storms, hurricanes, flooding, etc. In addition power outages occur during excessively prolonged periods of hot or cold weather as a result of failure of a regional or national power grid. Power outages caused by severe weather can last for days and sometimes weeks. During this time weather proofing the opening through which the electrical cord passes is a problem. This opening is usually a window, door or garage door. Most homes and businesses do not have any existing permanently installed outdoor electrical boxes or generator sub panels. Nor do they have any permanently installed transfer switches or other electrical power inlet boxes for the purpose of temporary connection to a portable external generator as a source of electrical power. Therefore the lack of permanently installed outdoor electrical connection capabilities for conveying electrical power into a building are usually associated with electrical power cords being run from an electrical generator through an opening in the building to the interior of the building to wherever the electrical power is required. The usual openings are windows, doors and/or garage doors. Running the electrical power cords through these openings leaves a gap in the openings which permits the entry of generator fuel and exhaust fumes, toxic carbon monoxide, rain, snow ice, sand and other additional adverse weather conditions. In addition, insects and/or small animals, such as rodents, can enter the building. These insects and animals can carry human diseases such as malaria, encephalitis, etc. The problem of them entering the building increases during wet conditions such as after tropical storms or hurricanes. Further, driving rain can enter the building through the opening and cause damage to the occupants or contents of the building.

DESCRIPTION OF THE PRIOR ART

U.S. Pat. No. 5,803,764, discloses a method and apparatus for weather proofing an opening through which an electrical cord passes. A truncated conical sealing element is formed from rubber or plastic and surrounds an end portion of the electrical cord in a manner that precludes the passage of water thereby. A truncated conical opening is provided in an element into which the electrical cord passes. The truncated conical sealing element cooperates with and engages the truncated conical opening in an interference fit to weather proof the conical opening and preclude the entry of water and insects. As a result, the truncated sealing element must be positioned within the truncated conical opening to provide a weather proof seal for the electrical cord entering a building. Since the truncated conical sealing element is normally sealed to the electrical cord, it cannot be easily repositioned on the cord. Therefore the portion of the electrical cord at which it enters the building cannot be easily changed.

U.S. Pat. No. 6,564,512, discloses a temporary panel which can be mounted in a window to allow air to be exhausted from a building while preventing reentry of evacuated dust and fumes. The panel has a large aperture therein for connection to an air moving system. This aperture is substantially larger than the diameter of an electrical cord and there is no provision to seal the aperture around the electrical cord to prevent the entry of water and insects.

U.S. Pat. No. 1,125,015, discloses a window ventilator. The ventilator includes a substantially rectangular bar having sufficient length to extend across a window sill and having its diagonally opposed edges cut away to form recesses. The upper edge of the ventilator is adapted to receive the lower edge of a window while the lower edge is hingedly connected to the window sill. The ventilator includes openings formed transversely and diagonally therethrough to allow air to flow through the apertures. However, if an electrical cord were passed through the apertures there are no provisions to seal the aperture around the cord to prevent the entry of water and insects.

SUMMARY OF THE INVENTION

Portable electrical generators are used to temporarily supply electrical power to homes and business in times of emergency and severe weather. The portable generators are normally located outside of the home or business for safety reasons. An electrical cord or wire must then be run from the generator to the inside of the home or business to supply electricity to the appliances in the building. The most convenient point of entry into a building is through an open window or door. The present invention provides a device which permits the passage of an electrical cord or wire through an open window or door while providing a weather proof seal for the opening and prevents the entry of carbon monoxide, adverse weather conditions, insects and small animals into the building. The device also prevents damage to the electrical cord or wire by not permitting the window or door to close directly onto the cord. A provision is made in the device to allow the passage of the electrical cord therethrough while maintaining the integrity of the sealed opening. The length of the electrical cord may be adjusted while it is protected by the device. The device may be formed from a number of different materials, closed cell foam being a preferred material. The device is preferably an elongate member with a provision for one or more electrical cords to pass transversely therethrough. The opening for the electrical cord can be adjusted to accommodate different size cords of varying diameters.

Accordingly, it is an objective of the instant invention to provide a device which permits the passage of electrical cords through an open window or door and also provide weather proofing for the opening.

It is a further objective of the instant invention to provide a device which permits the passage of electrical cords through an opening in a building while preventing the entry of carbon monoxide and other fumes into the building.

It is another further objective of the invention to provide a device which permits the passage of electrical cords through an opening in a building while preventing the entry of insects and small animals.

It is a still a further objective of the instant invention to provide an adjustable transverse opening through the device for the passage of electrical cords therethrough of varying diameters, sizes and shapes.

It is yet another objective of the instant invention to allow the device to be readily sized to accommodate different size window and/or door openings.

It is a still yet a further objective of the invention to provide protection of the electrical cords from damage caused by closing the window or door.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
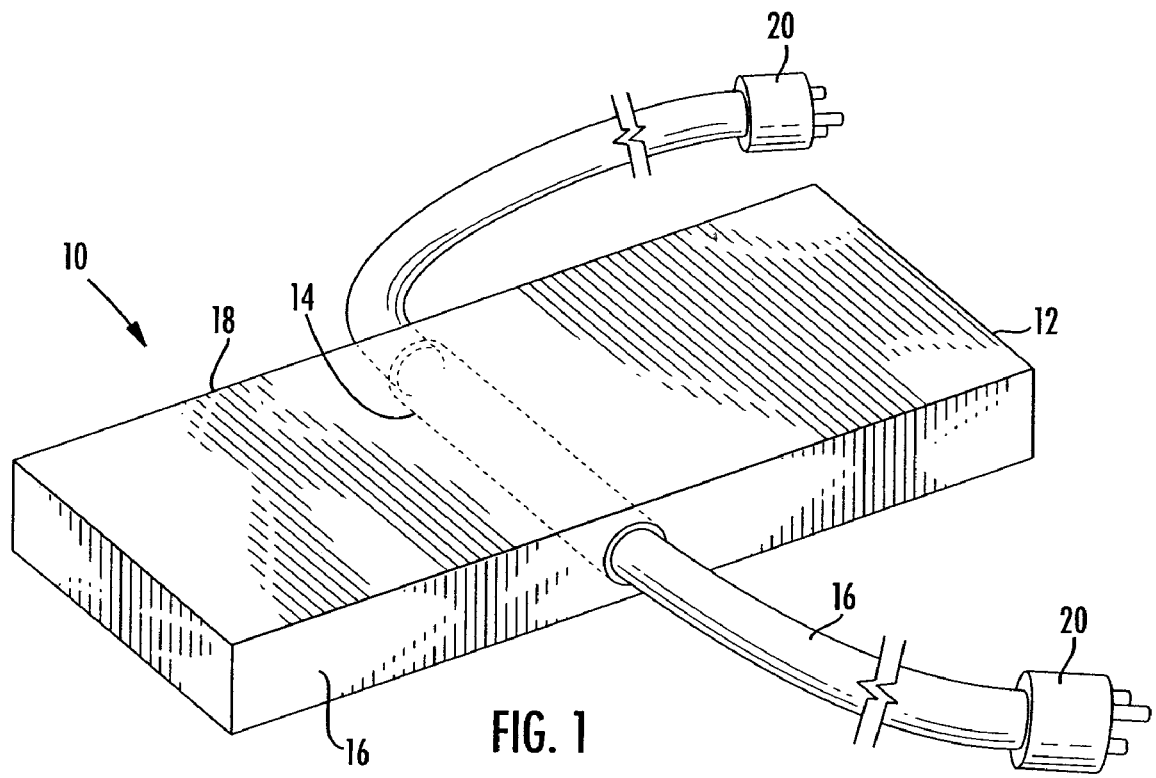
FIG. 1 is a front perspective view of the present invention with an electrical cord.

Referring now in detail to the drawings wherein like parts have like reference numerals, a new and improved window seal and electrical conduit retainer embodying the principles and concepts of the present invention and generally described by reference numeral 10 will be described. FIG. 1 is a perspective view of the window seal of the present invention. A seal 12, preferably made from resilient closed cell foam, is constructed and arranged to be placed in an opening in a window and prevent the entry of moisture, insects and hot or cold air into the building. Other materials from which the seal 12 may be formed include plastics, organic materials, foams, and resins. When organic materials are used they should be protected from moisture by encasing them with moisture resistant materials or coating them with moisture resistant materials. The seal could be formed as one continuous piece of material or a plurality of pieces of material encased within an envelope or enclosure. The seal could be manufactured in certain standard sized and then cut by the user to fit specific window or door openings.

The elongate seal 12 is provided with a passage or raceway 14 which allows an electrical cord or conduit 15 to pass through the seal from a front face 16 to a rear face 18. An electrical cord 15 is usually provided with a male electrical connector on one end and a female electrical connector on the other end. In certain applications a male electrical connector 20 is provided on both ends as illustrated in FIG. 1. This particular electrical cord is normally employed to connect a portable electrical generator (not shown) to special electrical panel (not shown) in a home or business. The special electrical panel in turn is connected to the main electrical panel which supplies electrical power from the power company to the electrical appliances in the home or business. The special electrical panel disconnects the electrical power from the power company and substitutes the electrical power from the electrical generator. The passageway or raceway 14 is preferably sized to accommodate a particular electrical cord and prevent the entry of moisture and/or insects into the building. In an alternative and more conventional setting the electrical cord has a male connector on one end and a female connector on the other end. This is usually the setting found in buildings under construction prior to the installation of electrical power by an electrical utility.

Figure 2:
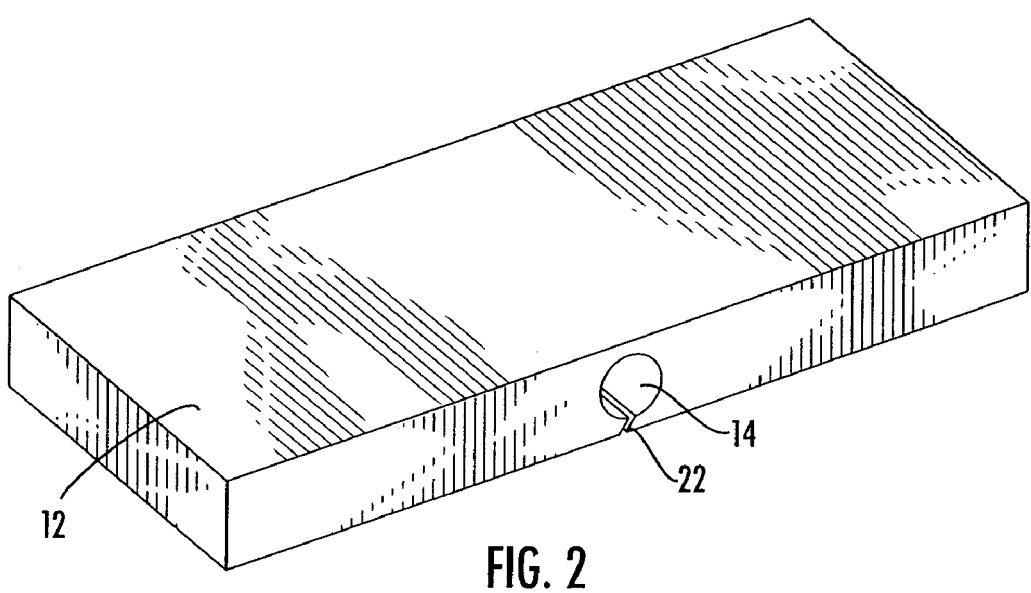
FIG. 2 is a front perspective view of the present invention illustrating the split through which an electrical cord can pass.
Figure 3:
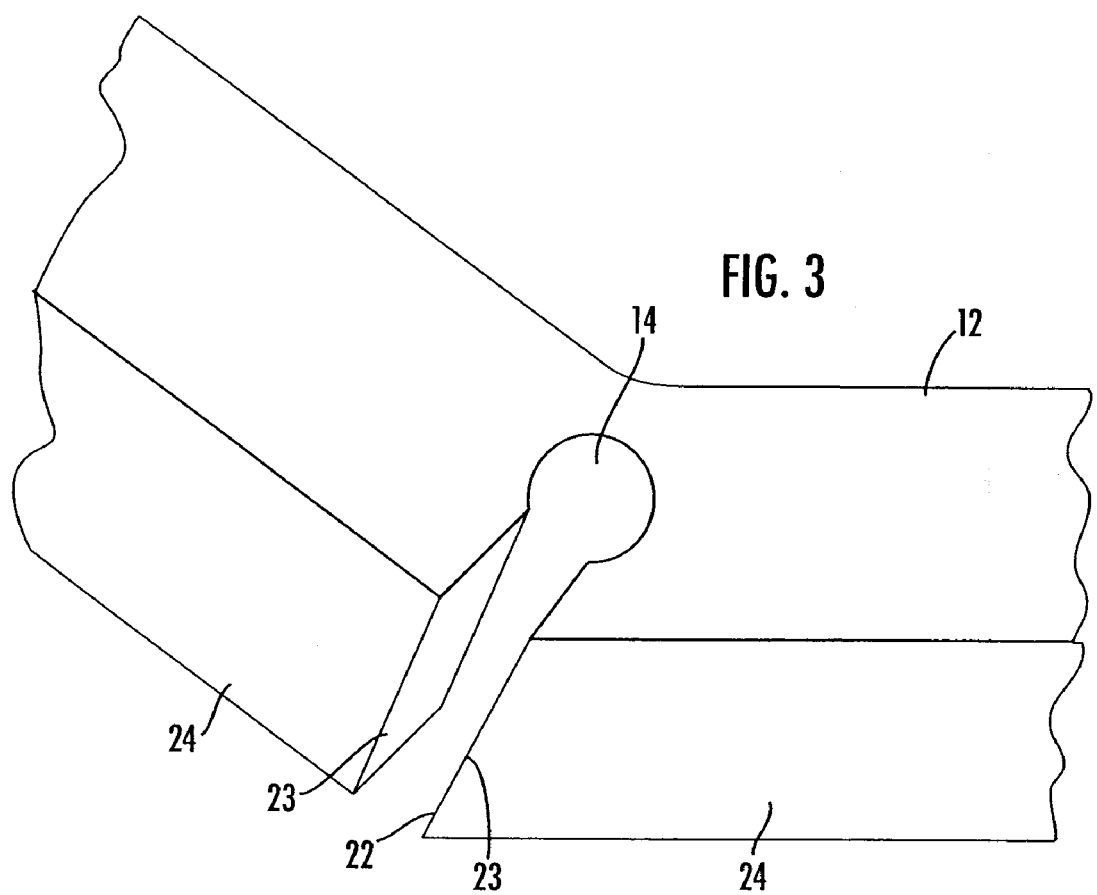
FIG. 3 is a front perspective view of the present invention with the slit separated.
Figure 4:
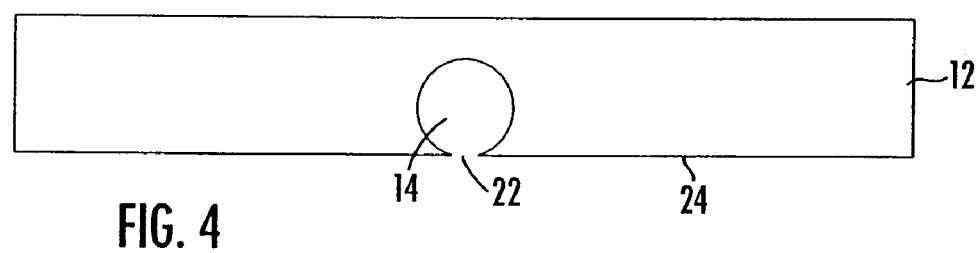
FIG. 4 is a front view in elevation of one embodiment of a passageway for an electrical cord.

Male and female electrical connectors are substantially larger in diameter than the electrical cord to which they are attached and as a result it would be impossible to thread an electrical connector through the passage or raceway 14 from one side of the seal to the other side. Therefore a slit 22, FIG. 2, is provided in the seal between the passageway 14 and an exterior surface thereof. In the embodiments illustrated in FIGS. 2 and 3 the silt 22 extends between the passageway 14 and the bottom surface 24 of the seal. When the resilient and flexible seal 12 is bent, as illustrated in FIG. 3, the silt 22 separates and allows an electrical cord 15 to be inserted into passageway 14. After the electrical cord has been inserted, the seal is then returned to its original position. Both sides 23 of the slit 22 are returned together in an abutting relationship thereby confining the electrical cord in the passageway and effectively sealing the passageway 14 to prevent the entry of moisture and/or insects into the building. In the embodiments of the invention illustrated in FIGS. 2, 3, 5 and 9 the passageway is located approximately in the middle of the depth of the seal 12. The slit 22 extends from the passageway 14 to the bottom surface 24 of the seal. In the embodiment illustrated in FIG. 4, the passageway is located adjacent the bottom surface of the seal and the slit 22 is just a line which extends along the junction of the passageway and the bottom surface of the seal.

Figure 5:
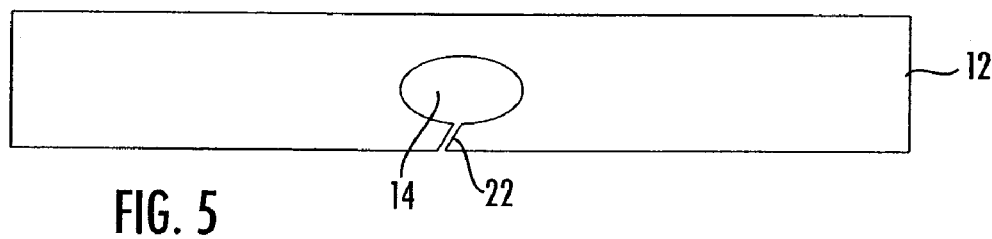
FIG. 5 is a front view in elevation of another embodiment of a passageway for an electrical cord.

The seal illustrated in FIG. 5 is provided with a passageway 14 which is noncircular in cross section. This shape is designed to accommodate electrical cords which are substantially flat or noncircular in cross section.

Figure 6:
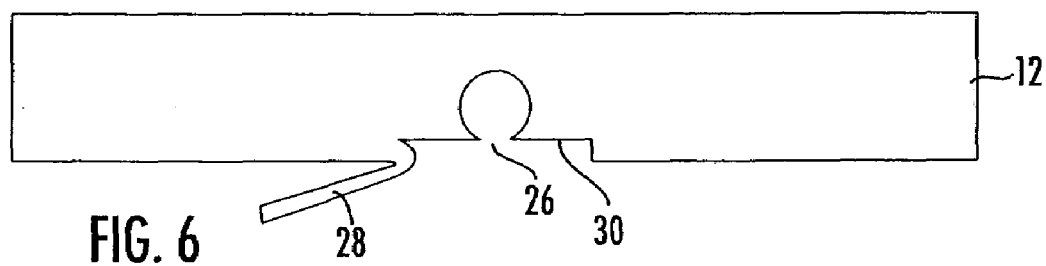
FIG. 6 is a front view in elevation of another embodiment of a passageway for an electrical cord.
Figure 7:
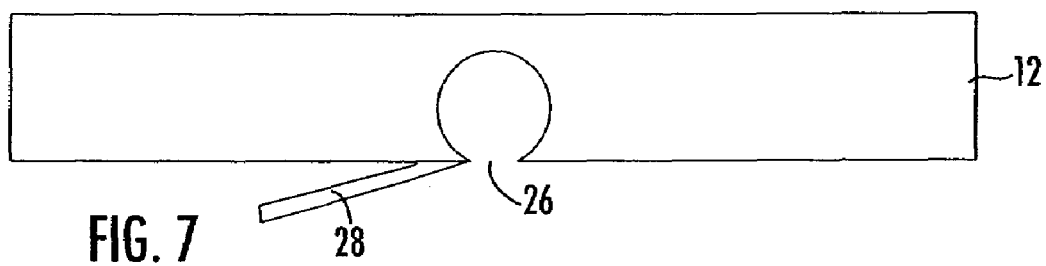
FIG. 7 is a front view in elevation of another embodiment of a passageway for an electrical cord.

FIGS. 6 and 7 are directed to another embodiment of the invention. The passageway 14 has an aperture 26 open to the exterior of the seal for insertion of an electrical cord into the passageway. After the electrical cord has been inserted into the passageway a flap 28 is positioned over the aperture 26 thereby closing the passageway and securing the electrical cord therein. The flap 28 may be a separate member hingedly secured to the bottom 24 of the seal, as illustrated in FIG. 7. The flap 28 may be held in position closing aperture 26 by frictional engagement of the seal material forming aperture 30, by securing means not shown, by the weight of the window or door bearing down on the seal, or by forming the flap 28 of a "plastic memory" material. This is defined as a material which will return to its original shape after it is deformed. Alternatively, the flap 28 may be formed from a portion of the seal 12, as illustrated in FIG. 6. When it is desired to insert the electrical cord into the seal the flap 28 is removed from a recessed aperture 30, a portion of the flap is hingedly connected to the seal 12. The electrical cord is inserted into the passageway and the flap 28 is returned to the recessed aperture. The flap is normally held in the recessed aperture by friction. However, additional securing means could be employed to retain the flap in the recessed aperture. In an alternative embodiment, the flap 28 is completely removed from the recessed aperture and returned thereto after the electrical cord has been inserted into the passageway.

Figure 8:
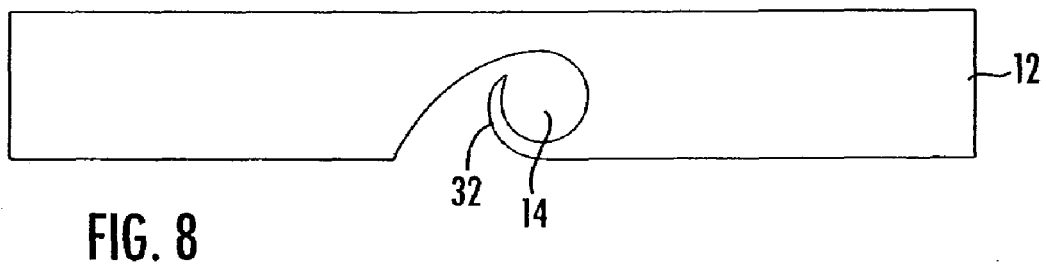
FIG. 8 is a front view in elevation of another embodiment of a passageway for an electrical cord.

FIG. 8 is directed to an additional embodiment of the invention. A portion of the seal 12 adjacent the passageway is formed as a flexible, adjustable sealing member 32 for the passageway 14. The sealing member 32 comprises a portion of the bottom 24 of the seal and a portion of the periphery of the passageway 14. The sealing member 32 is formed so as to have a tendency to curl towards the interior of the passageway 14. This allows different size electrical cords 15 to be placed into the passageway and then have the sealing member 32 close the passageway to the exterior, thereby maintaining a moisture and insect resistant seal.

Figure 9:
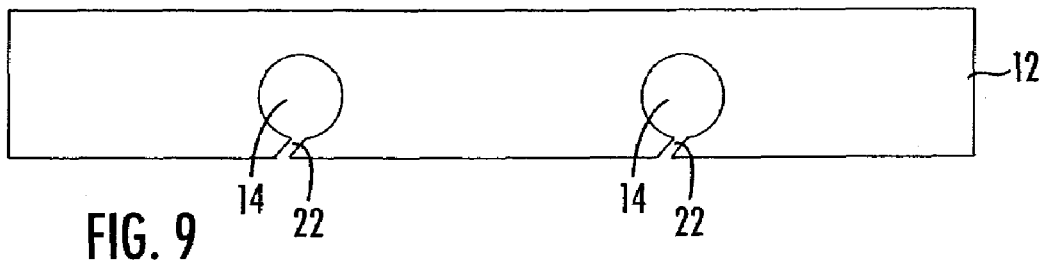
FIG. 9 is a front view in elevation of an embodiment with a provision for two cords.

FIG. 9 illustrates an embodiment wherein two passageways are provided for the passage of two electrical cords from the exterior of a building to the interior thereof. Any number of passageways could be provided in the seal. It is common for portable electrical generators which have an output above a certain level to have multiple electrical outputs thereby requiring multiple electrical cords passing into a building. Lager electrical generators also provide both 220 volt and 110 volt outputs.

Figure 10:
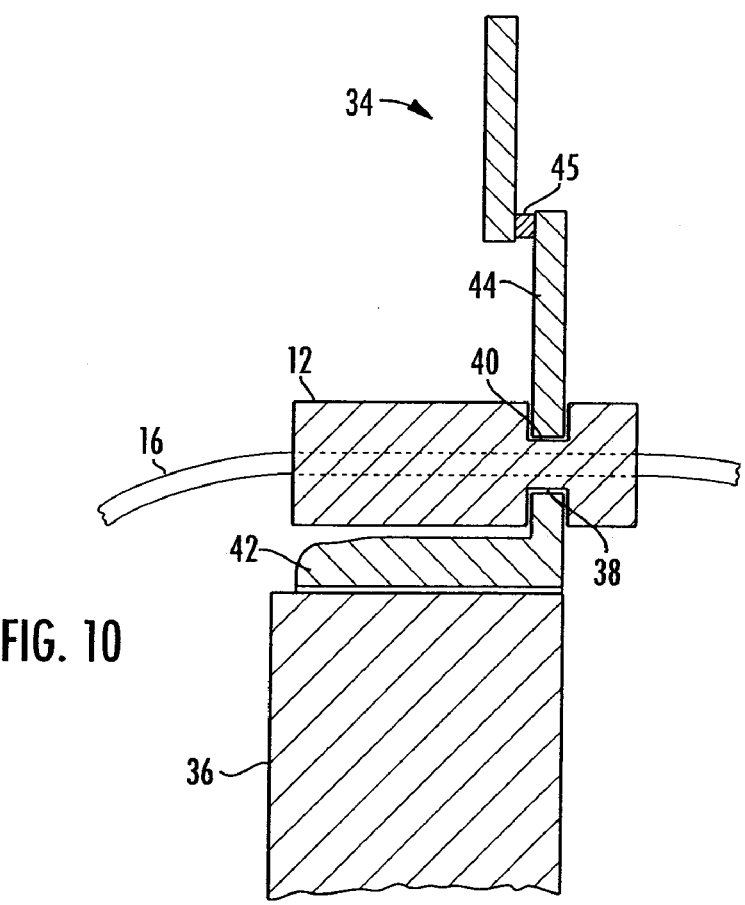
FIG. 10 is a cross sectional view of the present invention installed in a double hung window.

FIG. 10 illustrates the seal of the instant invention positioned in a conventional double hung window 34 located in a wall 36 of a building. The seal has two grooves 38 and 40 extending lengthwise along a top and bottom portion thereof. These grooves allow the seal 12 to engage the window sill 42 and lower window 44 and establish a sealing relationship between these members so as to prevent the entry of moisture and/or insects into the building. An additional seal 45 is located between the upper and lower windows to prevent the entry of moisture and/or insects into the building. The combination of seals 12 and 45 provide a sealing relationship which also prevents the hot or cold air on the exterior of the building from entering into the building.

Figure 11:
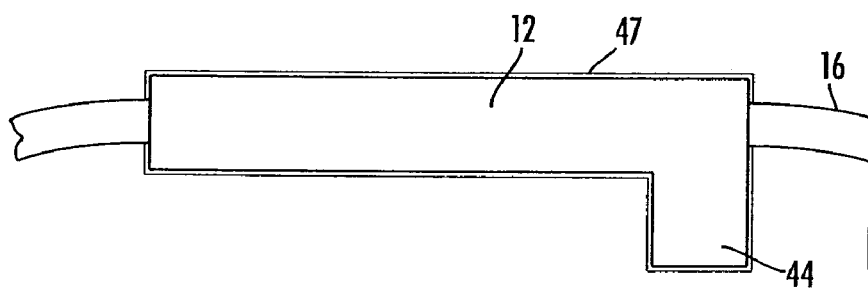
FIG. 11 is a side view in elevation of a further embodiment of the present invention.

FIG. 11 illustrates an embodiment of the seal wherein a flange 44 extends downwardly, lengthwise along a bottom edge portion of the seal. This flange is designed to engage a specific window or door opening and provide a seal for the opening. A layer of material 47, such as vinyl for example, encases the seal and acts as a protective barrier for the seal material against the elements of the weather.

Figure 12:
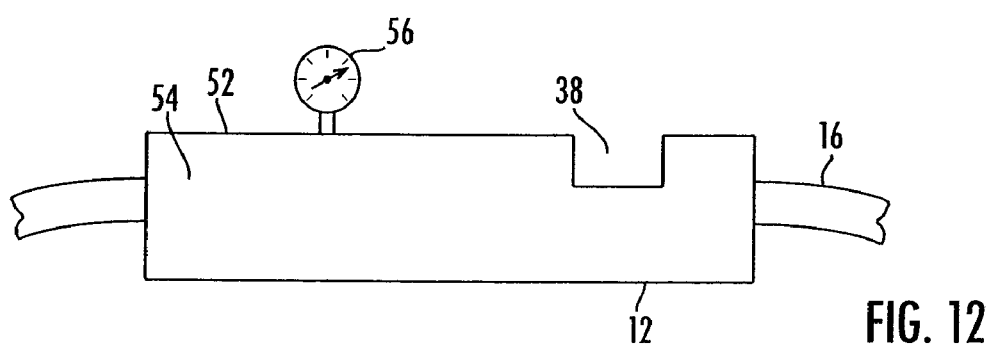
FIG. 12 is a side view in elevation of a further embodiment of the present invention.

FIG. 12 illustrates an embodiment wherein a single groove 38 is provided which extends lengthwise along a top or bottom portion of seal 12. FIG. 12 also illustrates an embodiment wherein the seal 12 is formed as an expandable, hollow bladder 52. The interior of the bladder 52 is filled with a gel or a fluid. The fluid can be a gas, such as air, or a liquid, such as water. A gauge and pressure regulator 56 is connected to the interior of the bladder 52. The gauge allows the pressure of the fluid inside of the bladder to be monitored and the pressure regulator allows removal of and introduction of fluid into the bladder to maintain a desired pressure.

Figure 13:
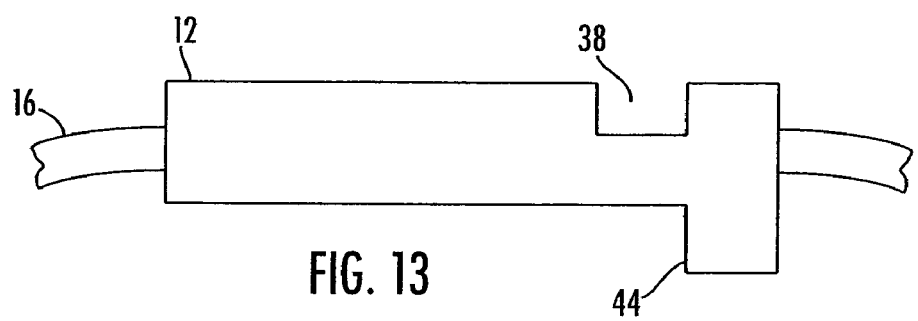
FIG. 13 is a side view in elevation of a further embodiment of the present invention.
Figure 14:
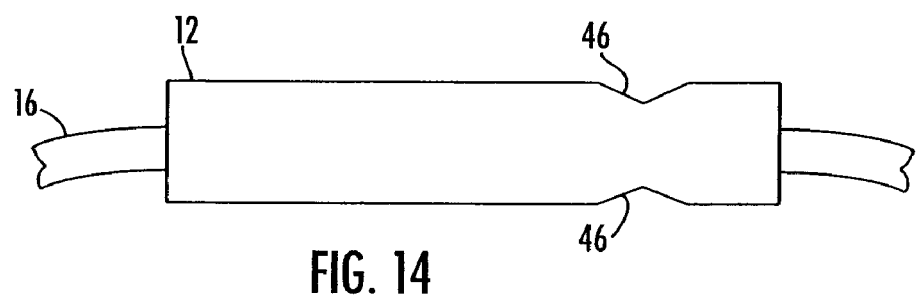
FIG. 14 is a side view in elevation of a further embodiment of the present invention.

FIG. 13 illustrates an embodiment wherein a groove 38 is provided on one side of the seal 12 and a flange 44 is provided on an opposite side of the seal. FIG. 14 illustrates an embodiment wherein two V-shaped grooves 46 are provided which extend lengthwise along a top and bottom portion of the seal 12.

Figure 15:
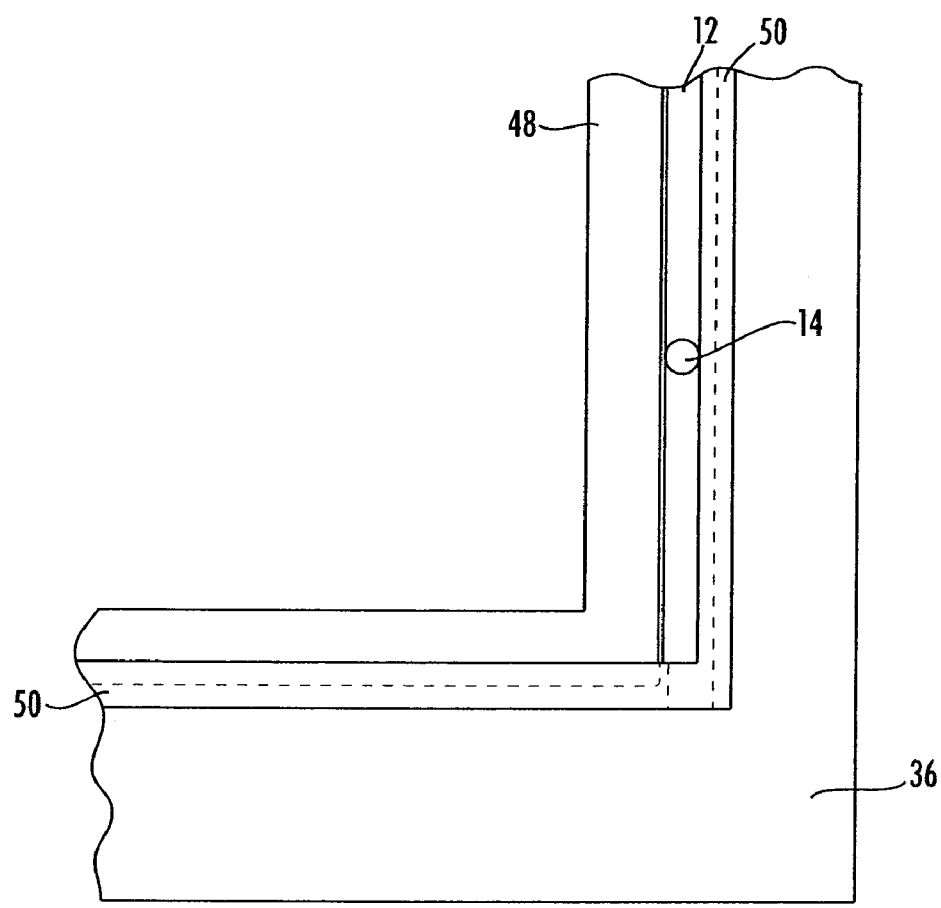
FIG. 15 is a view in elevation of the present invention installed in a gliding window.

FIG. 15 illustrates the seal of the present invention installed in a gliding window 48 which includes a frame 50. Gliding windows 48 move horizontally between open and closed positions and the frame 50 holds the window in the wall 36 of the building. The seal 12 is installed vertically along a side of the gilding window between a window portion and the frame 50. A passageway 14 is provided in the seal 12 for the passage of an electrical cord through the seal from the exterior to the interior of the building. An additional seal (not shown), similar to seal 45 if FIG. 10 is installed between windows 48 to prevent entry of moisture, weather, fumes, insects, etc. into the building.

Figure 16:
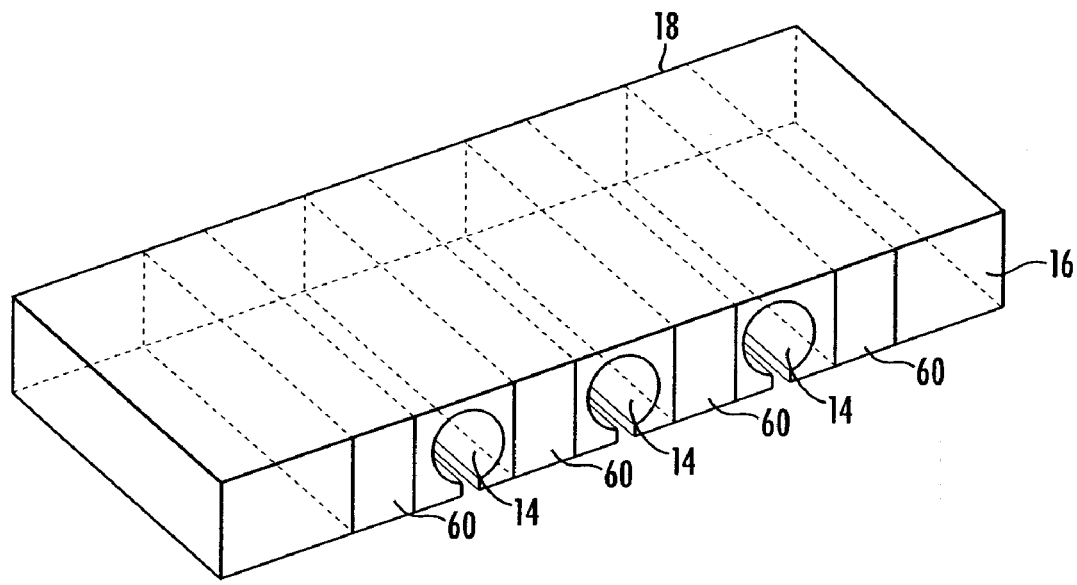
FIG. 16 is a front perspective view of a further embodiment of the present invention and FIG. 17 is a perspective view of a supplementary seal for insertion between the device and an electrical cord at either end of the device.

FIG. 16 illustrates an embodiment of the seal of the instant invention wherein reinforcement members 60 are installed in the seal and extend parallel to the raceways 14. These reinforcement members preferably extend along both sides of each raceway 14 from the front face 16 to the rear face 18 of the seal and prevent the seal and raceway from being crushed by an extreme force being applied to the seal. An example of this force would be a heavy garage door lowered onto the seal and electrical cords. In another embodiment, not illustrated, the reinforcement members 60 would extent longitudinally of the seal, substantially parallel to the front and rear faces of the seal, substantially the entire length of the seal. There would be a sufficient number of reinforcement members 60 to prevent the raceways 14 from being crushed. The reinforcement members 60 are preferably made from metal, but could also be made from any material which is stiff and incompressible and would prevent an exterior force from crushing the seal 12.

Figure 17:
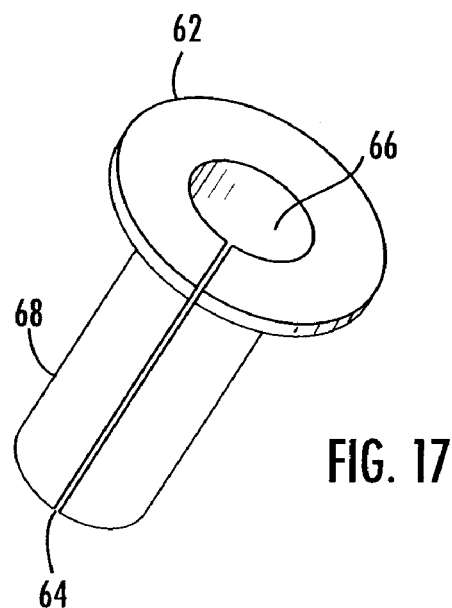

FIG. 17 illustrates a plug 62 which could be placed around an electrical cord and inserted into an end of the passageway or raceway 14 in the event that the electrical cord is smaller in diameter than the passageway. Each end of the passageway 14 would have a plug 62 surrounding the electrical cord. The plug is provided with a slit 64 so that is can be opened and placed around the electrical cord in a manner similar to the seal 12. The interior portion 66 of the plug 62 can be different shapes. For example, the interior 66 could be substantially flat so as to accommodate a flat electrical extension cord and the exterior portion 68 could be circular in cross section to conform to the shape of the passageway 14 in the seal. Utilizing these plugs different size and shaped electrical cords could be used with a substantially standard size seal 12. Also, if there is a size difference between the electrical cord and the passageway 14 the ends of the passageways could be plugged with cut up pieces of foam or seal material.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A seal comprising:
   an elongate member constructed and arranged to be placed in a window or door opening of a building and providing a weather proof seal of the entire opening;
   said elongate member having at least one transverse passageway for the passage of an electrical cord therethrough and
   a slit extending from an exterior surface of said elongate member to said at least one transverse passageway along the length of said transverse passageway whereby access to the length of said at least one transverse passageway from the exterior of said elongate member is gained.

2. The seal of claim 1 further comprising a closing member constructed and arranged to close said slit from said exterior surface of said elongate member to said at least one transverse passageway.

3. The seal of claim 1 wherein said seal comprises closed cell foam material.

4. The seal of claim 1 wherein said seal comprises a bladder filled with a gel.

5. The seal of claim 1 wherein said seal comprises a bladder fill with a fluid.

6. The seal of claim 5 further comprising means to control the pressure of the fluid in said bladder.

7. The seal of claim 3 further comprising a layer of vinyl material surrounding said foam.

8. The seal of claim 2 wherein said closing member comprises the side portions of the slit abutting against each other and thereby closing communication between said passageway and said exterior surface of said elongate member.

9. The seal of claim 2 wherein said closing member comprises a flap hingedly closing said slit.

10. The seal of claim 9 wherein the flap is comprises a portion of said elongate member and is positioned in a recessed aperture in said elongate member.

11. The seal of claim 2 wherein said closing member comprises a flexible portion of said seal positioned adjacent the periphery of said passageway, extending along the length thereof whereby said passageway is sealed from moisture and other elements entering therein.

12. The seal of claim 1 further comprising grooves extending longitudinally along the top or bottom surface of said elongate member; said grooves constructed and arranged to receive a portion of a window, a door or a sill therein.

13. The seal of claim 12 further comprising grooves extending longitudinally along both the top and bottom surfaces of said elongate member.

14. The seal of claim 10 wherein said flap is set into said recessed aperture in said elongate member such that no portion of said flap extends beyond an exterior surface of said elongate member.

15. The seal of claim 1 further comprising reinforcing members located within said elongate member and adjacent said at least one transverse passageway, said reinforcing members preventing said at least one transverse passageway from being crushed by an external force placed on said elongate member.

16. The seal of claim 1 further comprising at least one plug member capable of surrounding an electrical cord and insertable into an end of said at least one transverse passageway.

* * * * *